US011336365B2

(12) United States Patent
Baudoin et al.

(10) Patent No.: US 11,336,365 B2
(45) Date of Patent: May 17, 2022

(54) METHOD FOR MANAGING THE TELECOMMUNICATION DATA TRAFFIC OF A VERY HIGH THROUGHPUT SATELLITE COMMUNICATION SYSTEM

(71) Applicant: THALES, Courbevoie (FR)

(72) Inventors: Cédric Baudoin, Toulouse (FR); Sandra Vime, Toulouse (FR); Bertrand Onillon, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/054,502

(22) PCT Filed: Mar. 19, 2019

(86) PCT No.: PCT/EP2019/056780
§ 371 (c)(1),
(2) Date: Nov. 10, 2020

(87) PCT Pub. No.: WO2019/219275
PCT Pub. Date: Nov. 21, 2019

(65) Prior Publication Data
US 2021/0194574 A1    Jun. 24, 2021

(30) Foreign Application Priority Data

May 17, 2018 (FR) ..................... 1800480

(51) Int. Cl.
*H04B 7/185* (2006.01)
*H04B 7/12* (2006.01)

(52) U.S. Cl.
CPC ........... *H04B 7/18539* (2013.01); *H04B 7/12* (2013.01); *H04B 7/18523* (2013.01)

(58) Field of Classification Search
CPC ................. H04B 7/0413; H04B 7/18517
See application file for complete search history.

(56) References Cited

U.S. PATENT DOCUMENTS

| 2014/0274037 A1* | 9/2014 | Ganu | ...... H04W 8/14 |
| | | | 455/432.3 |
| 2018/0024246 A1* | 1/2018 | Jeong | ...... G01S 7/4817 |
| | | | 359/204.1 |
| 2020/0322044 A1* | 10/2020 | Knopp | ...... H04B 7/18517 |

FOREIGN PATENT DOCUMENTS

| EP | 2 337 238 A1 | 6/2011 |
| EP | 3 247 149 A1 | 11/2017 |
| WO | 2014/001837 A1 | 1/2014 |

OTHER PUBLICATIONS

La Pera, et al., "Digital Transparent Processor for Satellite Telecommunication Services", 2007 IEEE Aerospace Conference, Mar. 3, 2007.

(Continued)

*Primary Examiner* — Phirin Sam
*Assistant Examiner* — Debebe A Asefa
(74) *Attorney, Agent, or Firm* — BakerHostetler

(57) ABSTRACT

A method for managing the telecommunication data traffic of a very high throughput satellite communication system wherein, for each satellite, the management of a so-called n+p site diversity and/or of a load diversity is implemented in a digital transparent processor in the satellite to guarantee the availability of the very high throughput communication system.

7 Claims, 6 Drawing Sheets

(56) References Cited

OTHER PUBLICATIONS

Thompson, et al., "Concept of technology for a Terabit/s satellite supporting future broadband services via satellite", SPACOMM 2011: The Third International Conference on Advances in Satellite and Space Communications, 2011.

Jeannin, et al., "Smart gateways for terabit/s satellite", International Journal of Satellite Communications and Networking, vol. 32 (No. 2). pp. 93-106, 2014.

Angeletti, et al., "Smart Gateways concepts for high-capacity Multi-Beam networks", 30th AIAA International Communications System Conference (ICSSC), Sep. 24-27, 2012.

Kyrgiazos, et al., "Gateway diversity scheme for a future broadband satellite system", 6th Advanced Satellite Multimedia Systems Conference (ASMS) and 12th Signal Processing for Space Communications Workshop (SPSC), 2012.

* cited by examiner

METHOD FOR MANAGING THE TELECOMMUNICATION DATA TRAFFIC OF A VERY HIGH THROUGHPUT SATELLITE COMMUNICATION SYSTEM

CROSS-REFERENCE TO RELATED APPLICATIONS

This application is a National Stage of International patent application PCT/EP2019/056780, filed on Mar. 19, 2019, which claims priority to foreign French patent application No. FR 1800480, filed on May 17, 2018, the disclosures of which are incorporated by reference in their entirety.

FIELD OF THE INVENTION

The invention relates to a method for managing the telecommunication data traffic of a very high throughput satellite communication system.

BACKGROUND

The very high throughput satellite, or VHTS, systems are characterized by very significant capacities. In order to limit the number of gateways, the use of the Q/V band or a higher frequency band such as the W or Ka band is a major element. While they significantly increase the band per GW, these very high bands entail implementing space diversity mechanisms in order to fight against the very significant attenuations in these bands.

The diversity techniques have to limit as far as possible the impact on the system (whether it be the interruption time or capacity reduction) while being inexpensive.

A strategy managing space or geographic diversity and a strategy managing load diversity are notably known.

The space or geographic diversity strategy starts from the assumption that the spatial correlation of rain events decreases very strongly when considering a distance between two sites of a few kilometers (typically from 15 to 50 km). In other words, consider that it is highly improbable to have strong rain at the same time on two sites spaced apart by such a distance. For light rain, it is between 200 and 1000 km, and for a storm 10 km. It is then possible to use one or more redundant sites in order for the latter to take over the connecting link between a ground station and a satellite when a ground station is under rain. This space diversity strategy can take different forms depending on the type of redundancy chosen and how it is implemented.

The diversity or load-sharing strategy is based on the principle that a user spot (geographic zone on the surface of the Earth) is served simultaneously by several baseband gateways or hubs. When one of the hubs experiences an excessive attenuation, the set of terminals managed by the hub is switched to the other hubs serving these spots. This load-sharing can be implemented using a time- or frequency-multiplexing of the spectral resource. Finally, this technique can be implemented either by assuming a loss of capacity of the system during the rain event or by allowing the system capacity to be maintained (at the cost of a greater number of hubs).

The load-sharing diversity, or "smart diversity", is for example illustrated in the documents:
"Concept of technology for a Terabit/s satellite supporting future broadband services via satellite", by Paul Thompson, Barry Evans, Laurent Castanet, Michel Bousquet, Takis Mathiopoulos, SPACOMM 2011: The Third International Conference on Advances in Satellite and Space Communications;
"Smart gateways for terabit/s satellite", by Nicolas Jeannin, Laurent Castanet, Jose Radzik, Michel Bousquet, Barry Evans, Paul Thompson, International Journal of Satellite Communications and Networking, vol. 32 (No. 2). pp. 93-106. ISSN 1542-0973; and
"Smart Gateways concepts for high-capacity Multi-Beam networks", by Riccardo De Gaudenzi, Emiliano Re, Piero Angeletti, 30th AIAA International Communications System Conference (ICSSC), Sep. 24-27, 2012 Ottawa Canada.

Regarding the space diversity strategy, two techniques are primarily known: RF station redundancy and n+p site diversity.

n+p site diversity is for example described in the documents: "Gateway diversity scheme for a future broadband satellite system", by Argyrios Kyrgiazos, Barry Evans, Paul Thompson, and Jean Jeannin, 2012, 6th Advanced Satellite Multimedia Systems Conference (ASMS) and 12th Signal Processing for Space Communications Workshop (SPSC); and "Smart gateways for terabit/s satellite", by Nicolas Jeannin, Laurent Castanet, Jose Radzik, Michel Bousquet, Barry Evans, Paul Thompson, International Journal of Satellite Communications and Networking, vol. 32 (No. 2) p 93-106. ISSN 1542-0973.

RF redundancy, as illustrated in the example of FIG. 1, consists in having, for each hub 1, two RF ground stations 2, 3 sufficiently far apart to decorrelate the rain events (at least 15 km, and typically 50 km). The corresponding RF gateway 4 is also represented. This technique also allows the requirement of availability of the system to be satisfied. It is furthermore relatively simple to implement since it has no impact on the high layers and does not require specific onboard switching. It does however require a strong synchronization of the two RF paths, obtained by pre-compensation techniques. However, it appears relatively costly in terms of connection cost in order to interconnect the two sites (n times), and of number of RF stations which are duplicated, which significantly increases the operating expenditures or OPEX and the investment expenditures or CAPEX of the ground segment.

The n+p site diversity, as illustrated in the example of FIG. 2, can be presented as the reference redundancy scheme for the very high throughput systems, called THD systems. The principle consists in having p redundancy sites providing redundancy for up to p sites simultaneously from among the n nominal sites. This technique is extremely efficient in terms of availability, allowing availabilities significantly higher than the requirement (typically 99.9%) to be achieved with a very small number of hubs (1 to 3 for systems comprising a few tens of hubs). This solution involves a hub handover (the redundant hub 5 being able to be considered as a clone of the nominal hub 6) and a rerouting of the traffic to the redundant hub 5 (network switchover). In this sense, this diversity scheme approximates hot redundancy techniques, except that the decision takes account of the level of attenuation. At the payload level, the switchover from one hub 6 to another 5 is generally performed by electromechanical switches, which results in service interruptions of several seconds.

This solution has a higher cost but without loss of capacity in the case of rain.

The n+p site diversity is for example described in the documents "Gateway diversity scheme for a future broadband satellite system" (Nicolas Jeannin, Argyrios Kyrgiazos, Barry Evans, Paul Thompson, 2012 6th Advanced Satellite Multimedia Systems Conference (ASMS) and 12th Signal Processing for Space Communications), and "Smart gateways for terabit/s satellite" (Nicolas Jeannin, Laurent Castanet, Jose Radzik, Michel Bousquet, Barry Evans, Paul Thompson, International Journal of Satellite, Communications and Networking, vol. 32 (No. 2). pp. 93-106. ISSN 1542-0973).

Regarding the load-sharing diversity, a conventional solution, as illustrated in FIG. 3, consists in managing one spot by means of several hubs simultaneously, each of them taking over a subband of frequencies of the frequency band of the spot. The objective is to be able to make use of the capacity supplied by the hubs which are not under rain, to ensure the service of the users of a hub which has an attenuation exceeding its power margin. This solution is also called "smart diversity" or n+0 diversity, since no additional hub is necessary. The main advantage of this technique is that it does not require an additional hub (and the associated interconnection) to achieve the system availability. This scheme does however involve a more complex payload for separating and recombining the different subbands per spot. Furthermore, it involves a loss of capacity of 1/n if a hub experiences an attenuation greater than its power margin, 2/n if two hubs are unavailable simultaneously (with a lower probability), etc. Finally, this mechanism requires a handover to be performed of the users that the hub can no longer serve because of excessive attenuation. The latter must then be taken over (seamlessly, i.e. without traffic interruption) by the different hubs responsible for the spots concerned which are not in this situation.

This solution has a lower cost, but with a loss of capacity in case of rain.

SUMMARY OF THE INVENTION

One aim of the invention is to mitigate the problems cited previously, and notably in case of rain, inexpensively, to limit the loss of capacity.

According to one aspect of the invention, a method is proposed for managing the telecommunication data traffic of a very high throughput satellite communication system in which, for each satellite, the management of a so-called n+p site diversity and/or of a load diversity is implemented in a digital transparent processor (DTP) in the satellite to guarantee the availability of the very high throughput communication system.

Such a method makes it possible to avoid the impacts at the payload level, and to not add RF chains to handle the additional RF gateways for the diversity. It also avoids the requirement for additional gateways on the ground. This method is furthermore generic and benefits from the functions offered by the digital transparent processor DTP (flexible RF connectivity in the satellite). Finally, this method allows a rapid reconfiguration in case of hub handover and with very low losses at the satellite level (compared to solutions based on embedded switches).

In one implementation, the management of transitions between the so-called n+p site diversity and/or the load diversity is implemented in the digital transparent processor.

Transition between the two diversities is understood to mean a switch from one to the other regardless of direction.

Thus, it is possible to adapt the diversity solution implemented according to the required availability, the number of sites available, or payload constraints (for example number of RF chains handling the RF gateways).

According to one implementation, a so-called n+p site diversity is implemented by the digital transparent processor, by switchover from a nominal site to a diversity site, by a rerouting of the input ports of the switched-over nominal site to said diversity site, whose output ports are those of the switched-over nominal site.

Thus, it is possible to offer a very high availability while being transparent for the end users.

In one implementation, a load-sharing diversity allowing several sites to serve one user spot is implemented by the digital transparent processor by subdivision of the uplink frequency bandwidth into frequency subbands, and by allocation of these subbands to any set of output ports to frequency-multiplex them on the one hand to one and the same site for the forward channel and on the other hand to different sites for the return channel.

Thus, that makes it possible to avoid the additional RF gateways that are necessary for the N+p diversity, and the impacts at the payload level (no addition of RF chains to handle the additional RF gateways for the diversity, no edge switching).

According to one implementation, diversity transitions are implemented in the digital transparent processor of the satellite such that:

during a first period of implementation of the system, a so-called n+p site diversity or a load-sharing diversity is implemented, a site corresponding to a gateway/hub/antenna assembly, p representing the number of diversity sites that can simultaneously provide redundancy for the n nominal sites in site diversity mode;

during a second period of system ramp-up, a site diversity is implemented when the first period implements a load-sharing diversity or maintained when the first period already implements a site diversity, and nominal sites are added and n increases; and during a third period when the system is at full load, a load-sharing diversity is implemented, and the p diversity site or sites are used as nominal sites.

Such a method allows, in case of rain and inexpensively, for no loss of capacity.

In one implementation, p initially has the value 1 or 2.

According to one implementation, a transition from the first period to the second period is performed when the bandwidth managed by the initial nominal sites deployed during the first period is smaller than the total bandwidth needed to serve all of the terminals using the communication system.

The total bandwidth is a functional characteristic of the system: if, at the start, two gateways GW have been deployed, each managing 12 GHz of bandwidth, if the need for the terminals becomes greater than 24 GHz of bandwidth, then an additional gateway GW must be deployed, and that is done before saturation of the system.

In one implementation, a transition from the second period to the third period is performed when the number of nominal sites is equal to the number of site reception chains embedded onboard the satellites of the very high throughput communication system.

Thus, there is no need to deploy new sites or new gateways to manage the diversity, while ensuring the availability of the gateway-satellite links.

Also proposed, according to another aspect of the invention, is a very high throughput satellite communication system comprising means for managing the operation of the telecommunication data traffic comprising a digital transparent processor per satellite to implement the method as described previously.

BRIEF DESCRIPTION OF THE DRAWINGS

The invention will be better understood on studying a few embodiments described as nonlimiting examples and illustrated by the attached drawings in which.

Throughout the figures, the elements that have the same references are similar.

DETAILED DESCRIPTION

The present invention relates to a method for managing the telecommunication data traffic of a very high throughput satellite communication system in which, for each satellite, the management of a so-called n+p site diversity and/or of a load diversity is implemented in a digital transparent processor DTP in the satellite to guarantee the availability of the very high throughput communication system.

The management of transitions between the so-called n+p site diversity and the load diversity is implemented in the digital transparent processor DTP.

A so-called n+p site diversity is implemented is implemented by the digital transparent processor DTP, by switchover from a nominal site to a diversity site, by a rerouting of the input ports of the switched-over nominal site to said diversity site, whose output ports are those of the switched-over nominal site.

A load-sharing diversity allowing several sites to serve one user spot is implemented is implemented by the digital transparent processor DTP by subdivision of the uplink frequency bandwidth into frequency subbands, and by allocation of these subbands to any set of output ports to frequency-multiplex them on the one hand to one and the same site for the forward channel and on the other hand to different sites for the return channel.

Figure 1:
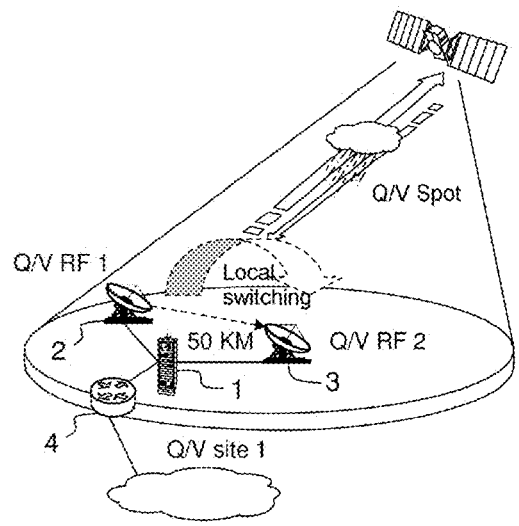
FIG. 1 schematically represents a method for managing the telecommunication data traffic of a very high throughput satellite communication system with RF redundancy, according to the state of the art.
Figure 2:
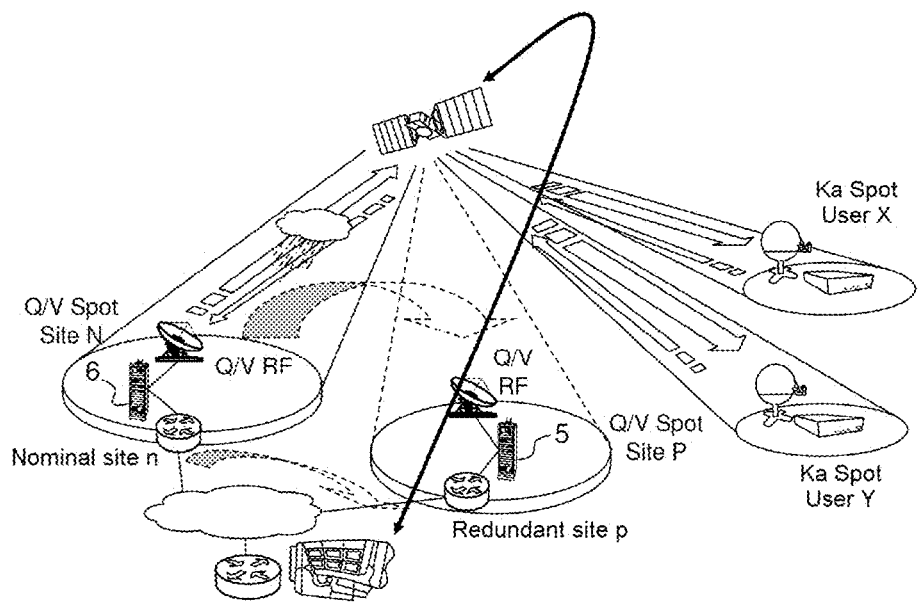
FIG. 2 schematically illustrates a method for managing the telecommunication data traffic of a very high throughput satellite communication system with so-called n+p site diversity, according to the state of the art.
Figure 3:
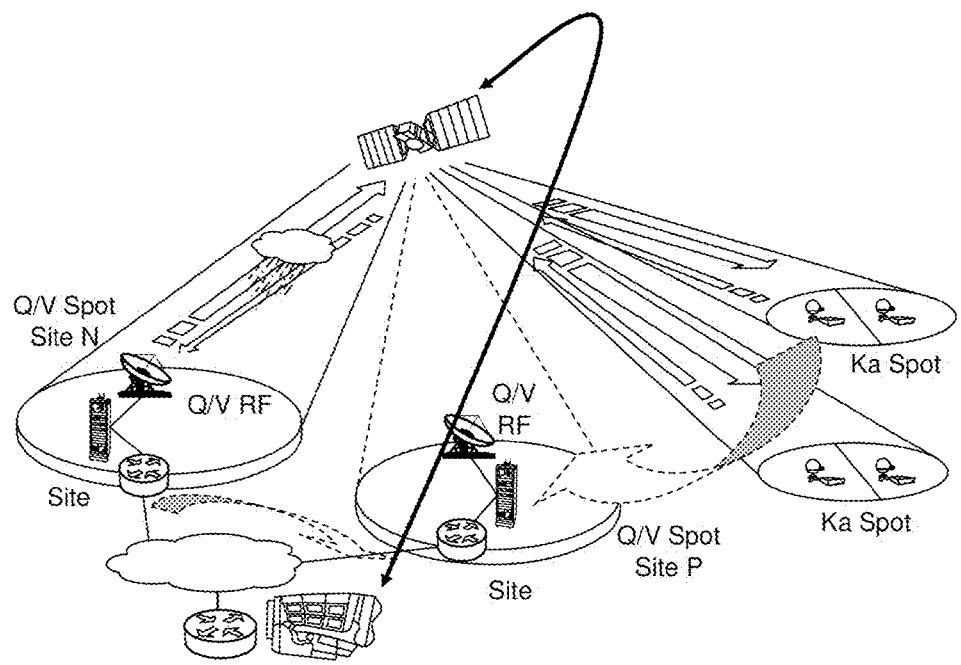
FIG. 3 schematically illustrates a method for managing the telecommunication data traffic of a very high throughput satellite communication system with load sharing, according to the state of the art.
Figure 4:
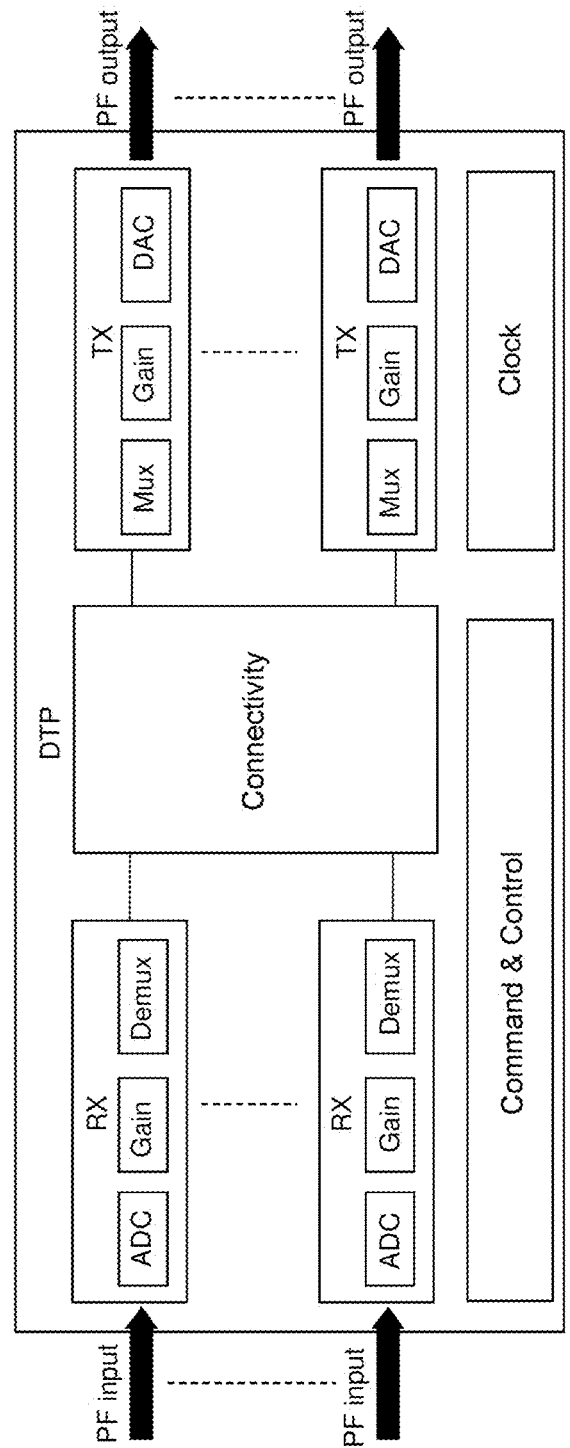
FIG. 4 schematically illustrates a digital transparent processor (DTP)

FIG. 4 represents a digital transparent processor or DTP present in each satellite.

The signals from the input ports RFinput (originating from the antennas) are respectively digitized and filtered by the digitization function with the acronym ADC for "Analog-Digital Converter" of the reception module RX.

The digitized samples that are thus obtained are then amplified by the gain function of the reception module RX.

The digitized and amplified signals are then demultiplexed by the demultiplexing function Demux of the reception module RX, to be transmitted to the port of the connectivity switching matrix of the DTP, for example if the frequency band originating from an input port RFinput is higher than the input frequency band of the connectivity switching matrix of the DTP then it must be split into several frequency subbands.

The connectivity switching matrix then allows any frequency subband of an input port RFinput to be connected to any frequency subband of the same size of an output port RFoutput.

The connectivity switching matrix therefore ensures the frequency switching and transposition function.

The digital signals at the output of the connectivity switching matrix are then multiplexed by the multiplexing function Mux of the transmission module TX to be matched to the frequency bands of the output ports RFoutput.

The digital samples are then amplified by the Tx gain function.

The amplified digital samples are then transformed into analog signals by the digital/analog conversion function DAC, DAC being the acronym for "Digital to Analog Converter", and transmitted to the output ports RFoutput (amplification and antenna).

The clock function is responsible for the fine synchronization of the DTP which is required on the one hand for the date-stamping of the configuration commands and on the other hand for the reconstruction of the analog signals from the digitized samples which have passed through the connectivity switching matrix.

The command and control function Command & Control is responsible for applying remote controls originating from the ground and telemetry information.

The DTP is configured through the definition of the logic channels which are characterized by:
- an input port RFinput;
- an input frequency band;
- an output port RFoutput;
- an output frequency band (of the same size as the input frequency band but may be transposed in frequencies).

For a given gateway, the configuration of the channels consists in defining, for each carrier or group of carriers originating from the gateway GW, a logical channel to a user spot as output for the forward channel, and the reverse in the return channel.

For the site diversity, the configuration of the DTP consists, for the nominal sites, in connecting the different groups of carriers transmitted by a gateway GW with the different user spots for the forward channel and the reverse for the return channel.

A switchover from nominal site n to a redundant site p is performed by modifying the configuration of the logical channels of the gateway n to replace the input ports n with the input ports p (the frequency bands and transposition remaining identical).

For the site diversity, the configuration consists in defining logical channels to a given user spot originating from several gateways. For the load-sharing diversity for example of three gateways for a spot, three channels are defined for a given user spot on the forward channel, each of them originating from a different gateway (and therefore from an input port RFinput of the different DTP). The definition of the channels via the transposition in frequency band then allows the different carriers to be multiplexed to one and the same user spot.

If, during the first period P1, a site diversity is implemented, during the second period P2 the configuration is modified to add additional gateways, and therefore add extra channels which will be able to be switched to the different user spots.

If, during the first period P1, a load-sharing diversity is implemented, upon the transition to the second period P2, the configuration of the DTP is modified to change from a load-sharing configuration to a site diversity configuration by taking account of the newly introduced gateways.

Likewise, the configuration is modified upon the transition from the second period P2 to the third period P3 to change from a site diversity configuration to a load-sharing configuration.

Figure 5:
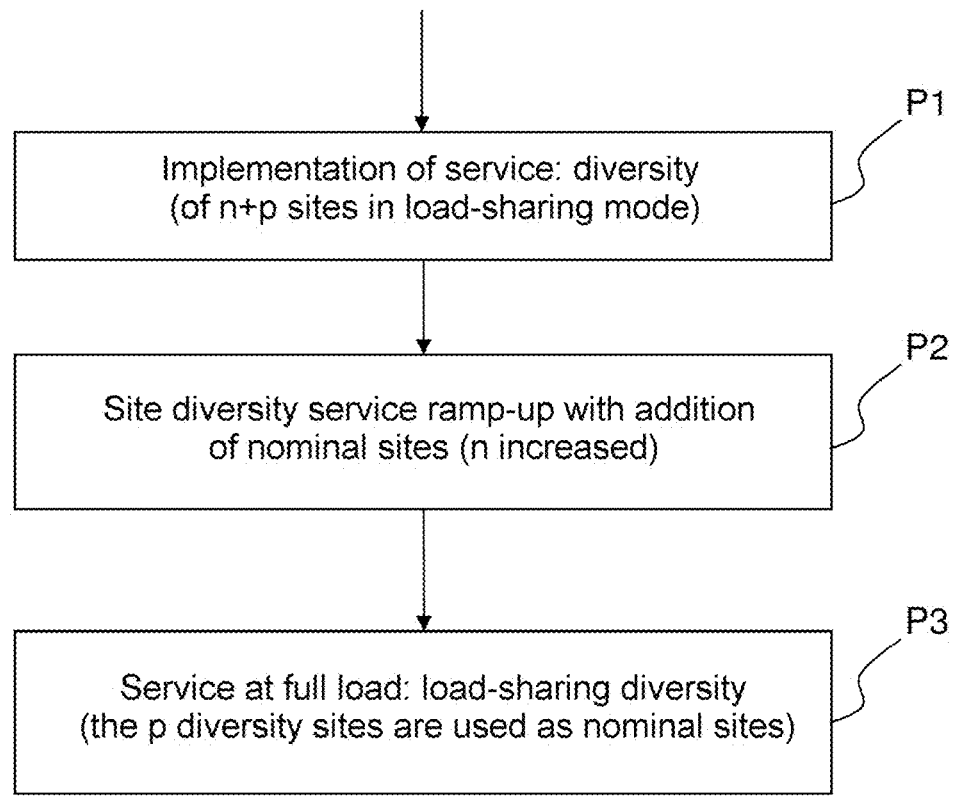
FIG. 5 schematically represents a method for managing the telecommunication data traffic of a very high throughput satellite communication system, according to an aspect of the invention.

FIG. 5 schematically represents a method for managing the telecommunication data traffic of a very high throughput satellite communication system, according to an aspect of the invention.

For each satellite, there is implemented, in the digital transparent processor (DTP):

during a first period P1 of implementation of the system, a so-called n+p site diversity or a load-sharing diversity is implemented, a site corresponding to a gateway/hub/antenna assembly, p representing the number of diversity sites that can simultaneously provide redundancy for the n nominal sites in site diversity mode;

during a second period P2 of system ramp-up, a site diversity is implemented when the first period P1 implements a load-sharing diversity or maintained when the first period P1 already implements a site diversity, and nominal sites are added and n increases; and during a third period P3 when the system is at full load, a load-sharing diversity is implemented, and the p diversity site or sites are used as nominal sites.

The present invention allows two diversity techniques (n+p site diversity and load-sharing diversity) to be used, each in a moment when it is respectively best suited, and without addition of hardware onboard the satellites or on the ground.

The present invention offers many advantages:

there is no impact at the payload level (no addition of transponders or of dedicated switching matrix), there is no impact on the costs or on the payload performance levels, it is a generic solution which reuses the flexibility mechanisms offered by the digital transparent processors DTP, there is no loss of capacity during rain events during the period P2 and possibly the period P1 when the site diversity is implemented during this period, until the one or two last gateways GW are deployed, and the site redundancy is managed by a reconfiguration of the digital transparent processors DTP, which is very rapid (compared to an electromechanical switching or "switch guide" solution) and has a very short interruption time.

Thus, the present invention offers the advantages of the n+p site diversity and load-sharing diversity techniques while limiting their respective drawbacks.

There is a switchover from the first period P1 to the second period P2 when the sites (or gateways) initially deployed are no longer able to send and receive the bandwidth needed to manage the traffic. New sites (or gateways) are then deployed to accompany the ramp-up of traffic.

There is a switchover from the second period P2 to the third period P3 when the number of nominal sites (or nominal gateways) deployed is equal to the number of sites (or gateways) supported by the system determined by design of the satellite.

The principle of the invention is to manage the diversity for the high frequency bands (typically Q/V) by the digital transparent processors DTP of the satellites, and to combine the n+p site diversity and the load-sharing diversity as a function of the load of the system in order not to introduce additional sites (on the ground) or antenna feeds and associated RF chains (onboard the satellites).

The n+p diversity is managed by modifying the channels of a digital transparent processor DTP on a precise date and synchronized with the ground segment (or hub). For its part, the load-sharing diversity is managed via the flexibility and routing mechanisms offered by the digital transparent processors DTP (the carriers of two gateways are routed to one and the same spot).

Figure 6:
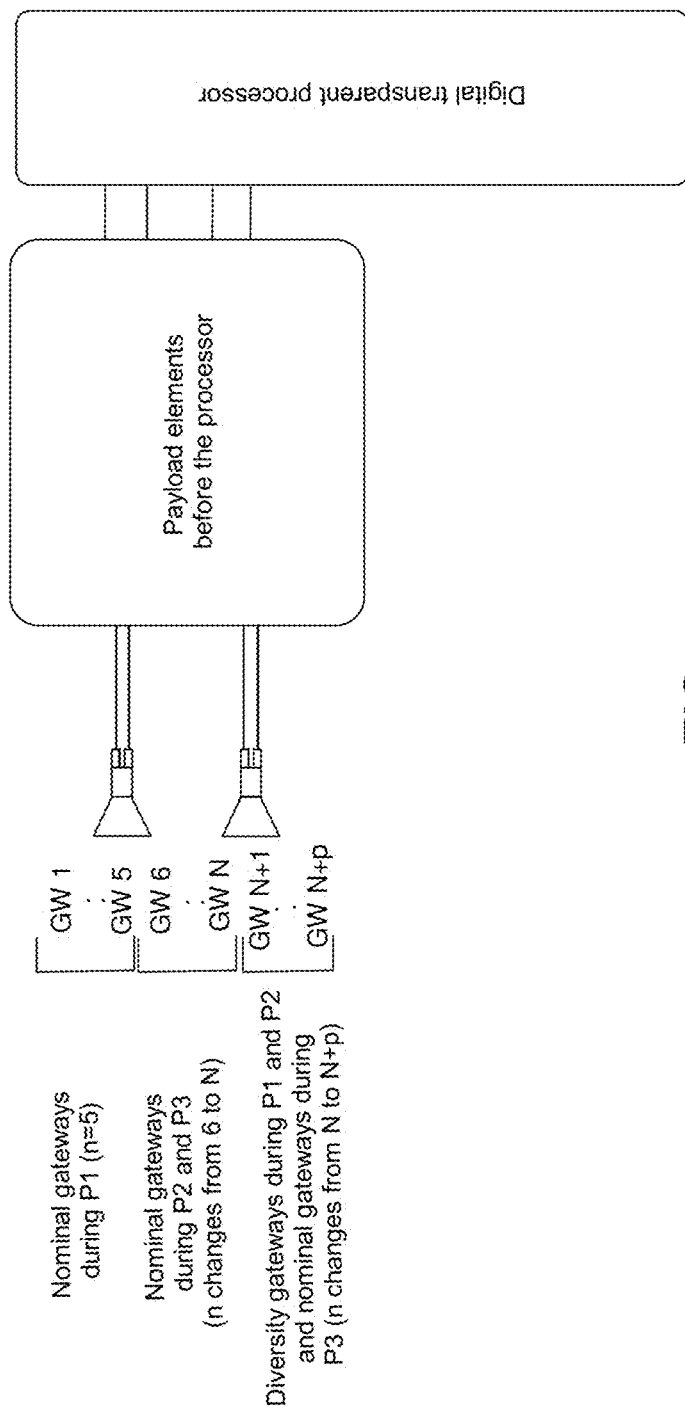
FIGS. 6 and 7 represent a system for managing the telecommunication data traffic of a very high throughput satellite communication system, respectively for the forward channel payload and the return channel payload, according to one aspect of the invention.
Figure 7:
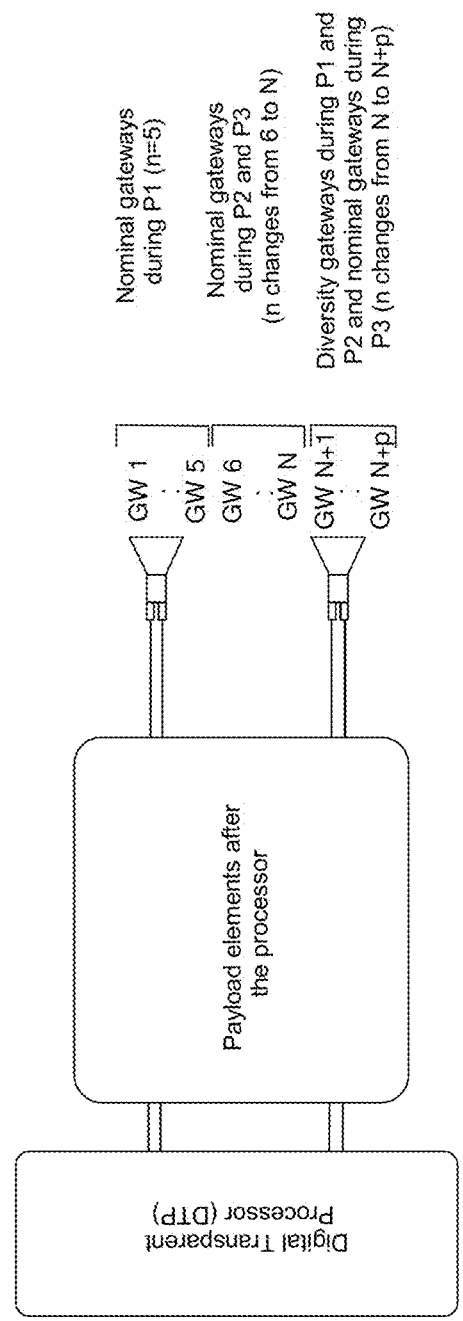

FIGS. 6 and 7 represent a system for managing the telecommunication data traffic of a very high throughput satellite communication system, respectively for the forward channel payload and the return channel payload, according to an aspect of the invention.

FIG. 6 presents the forward chain onboard the satellite. The latter has N+p antenna feeds, which are then filtered, amplified then frequency-converted before being routed in the DTP.

During the first period P1, a site or load-sharing diversity is implemented, in this case with 5 nominal gateways (n=5) GW1, GW2, . . . GW5.

The N-6+1 gateways GW6, GW7, GWN are not used during this first period P1 of implementation of the system.

During the second period P2, the N-6+1 gateways GW6, GW7, GWN become, one after the other, nominal gateways, as a function of the deployment of new gateways GW to ensure the ramp-up of the system (new users use this system and therefore require more bandwidth).

The diversity gateways during the third period P3 the p diversity gateways during the first and second periods P1 and P2 instantaneously become nominal gateways (n changes from N to N+p).

FIG. 7 presents the return chain onboard the satellite. The latter has N antenna feeds, which are then filtered, amplified, re-filtered then frequency-converted before being routed in the DTP.

During the first period P1, a site or load-sharing diversity is implemented, in this case with 5 nominal gateways (n=5) GW1, GW2, GW5.

The N-6+1 gateways GW6, GW7, GWN are not used during this first period P1 of implementation of the system.

During the second period P2, the N-6+1 gateways GW6, GW7, GWN become, one after the other, nominal gateways, as a function of the deployment of new gateways GW to ensure the ramp-up of the system (new users use this system and therefore require more bandwidth).

The diversity gateways during the third period P3 and the p diversity gateways during the first and second periods P1 and P2 instantaneously become nominal gateways (n changes from N to N+p).

If an operator wants the gateways during the third period P3 when the system is at full load to be different from those of the diversity sites, that affects only the number of antenna feeds and a few switches close to the feeds (with a very low impact).

The invention claimed is:

1. A method for managing the telecommunication data traffic of a very high throughput satellite communication system, the method for managing telecommunication data traffic of a very high throughput satellite communication system comprising:

wherein, for each satellite, a management of a so-called n+p site diversity and/or of a load-sharing diversity is implemented in a digital transparent processor (DTP) in the satellite to guarantee an availability of the very high throughput satellite communication system;

wherein the so-called n+p site diversity is implemented by the digital transparent processor (DTP), by switchover from a nominal site to a diversity site, by a rerouting of input ports from a switched-over nominal site to said diversity site, whose output ports are those of the switched-over nominal site; and wherein the load-sharing diversity allowing several sites to serve one user spot is implemented by the digital transparent processor (DTP) by subdivision of an uplink frequency bandwidth into frequency sub-bands, and by allocation of these sub-bands to any set of output ports to frequency-multiplex them on the one hand to one and a same site for a forward channel and on the other hand to different sites for a return channel.

2. The method as claimed in claim 1, wherein the management of transitions between the so-called n+p site diversity and the load diversity is implemented in the digital transparent processor (DTP).

3. The method as claimed in claim 1, wherein diversity transitions are implemented in the digital transparent processor (DTP) of the satellite such that:

during a first period (P1) of implementation of the system, a so-called n+p site diversity or a load-sharing diversity is implemented, a site corresponding to a gateway/hub/antenna assembly, p representing a number of diversity sites that can simultaneously provide redundancy for n nominal sites in site diversity mode;

during a second period (P2) of system ramp-up, a site diversity is implemented when the first period (P1) implements a load-sharing diversity or maintained when the first period (P1) already implements a site diversity, and nominal sites are added and n increases; and during a third period (P3) when the system is at full load, a load-sharing diversity is implemented, and the p diversity site or sites are used as nominal sites.

4. The method as claimed in claim 3, wherein p initially has a value 1 or 2.

5. The method as claimed in claim 3, wherein a transition from the first period (P1) to the second period (P2) is performed when a bandwidth managed by initial nominal sites deployed during the first period (P1) is smaller than a total bandwidth necessary to serve all terminals using the communication system.

6. The method as claimed in claim 3, wherein a transition from the second period (P2) to the third period (P3) is performed when a number of nominal sites is equal to a number of site reception chains embedded onboard the satellites of the very high throughput satellite communication system.

7. A very high throughput satellite communication system comprising means for managing operation of the telecommunication data traffic comprising a digital transparent processor (DTP) per satellite to implement the method as claimed in claim 1.

* * * * *

UNITED STATES PATENT AND TRADEMARK OFFICE
CERTIFICATE OF CORRECTION

| | | |
|---|---|---|
| PATENT NO. | : 11,336,365 B2 | Page 1 of 1 |
| APPLICATION NO. | : 17/054502 | |
| DATED | : May 17, 2022 | |
| INVENTOR(S) | : Cédric Baudoin et al. | |

It is certified that error appears in the above-identified patent and that said Letters Patent is hereby corrected as shown below:

In the Claims

In Claim 2, Column 9, Line 17, "wherein the management of transitions" should be -- wherein management of transitions --.

Signed and Sealed this
Second Day of August, 2022

Katherine Kelly Vidal
*Director of the United States Patent and Trademark Office*